(12) United States Patent
Liang et al.

(10) Patent No.: US 12,507,850 B2
(45) Date of Patent: Dec. 30, 2025

(54) CLEANING ROBOT

(71) Applicant: Beijing Roborock Innovation Technology Co., Ltd., Beijing (CN)

(72) Inventors: Zhenyu Liang, Beijing (CN); Yanjun Liu, Beijing (CN); Lizhi Xiang, Beijing (CN); Zhijun Li, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 561 days.

(21) Appl. No.: 17/905,114

(22) PCT Filed: Oct. 19, 2020

(86) PCT No.: PCT/CN2020/121975
§ 371 (c)(1),
(2) Date: Aug. 26, 2022

(87) PCT Pub. No.: WO2021/169329
PCT Pub. Date: Sep. 2, 2021

(65) Prior Publication Data
US 2023/0139659 A1   May 4, 2023

(30) Foreign Application Priority Data
Feb. 27, 2020   (CN) .......................... 202010124592.3

(51) Int. Cl.
*A47L 11/40* (2006.01)
*A47L 9/28* (2006.01)
*A47L 9/00* (2006.01)

(52) U.S. Cl.
CPC ............... *A47L 9/2826* (2013.01); *A47L 9/00* (2013.01); *A47L 11/40* (2013.01); *A47L 2201/06* (2013.01)

(58) Field of Classification Search
CPC ........ A47L 9/00; A47L 9/2826; A47L 9/2805; A47L 9/2825; A47L 11/40
See application file for complete search history.

(56) References Cited

U.S. PATENT DOCUMENTS

| 5,307,273 A | 4/1994 | Oh |
| 5,440,216 A | 8/1995 | Kim |

(Continued)

FOREIGN PATENT DOCUMENTS

| CN | 2001079005 A | 3/2001 |
| CN | 1517188 A | 8/2004 |

(Continued)

OTHER PUBLICATIONS

International Search Report for PCT Patent Application No. PCT/CN2020/121973 mailed Jan. 20, 2021.

(Continued)

*Primary Examiner* — Michael D Jennings
(74) *Attorney, Agent, or Firm* — Thomas Horstemeyer, LLP

(57) ABSTRACT

A cleaning robot, comprising: a robot body, a control unit provided in the robot body, and a fixing unit provided at the bottom of a front end of the robot body, the fixing unit comprising a sleeve and an ultrasonic sensor, the ultrasonic sensor being fixed in the sleeve and being electrically connected to the control unit, and the ultrasonic sensor being used for emitting an ultrasonic wave downwards and receiving an echo reflected by different ground forms.

11 Claims, 6 Drawing Sheets

(56) References Cited

U.S. PATENT DOCUMENTS

| | | | | |
|---|---|---|---|---|
| 5,542,146 | A | * | 8/1996 | Hoekstra ............... A47L 9/2842 15/319 |
| 7,203,993 | B2 | * | 4/2007 | Tondra ................. A47L 9/2889 15/362 |
| 8,867,800 | B2 | | 10/2014 | Bullis et al. |
| 10,518,416 | B2 | | 12/2019 | Haegermarck |
| 2005/0224163 | A1 | * | 10/2005 | Cho ....................... B41M 5/025 156/230 |
| 2005/0278888 | A1 | * | 12/2005 | Reindle ................. A47L 9/2857 15/319 |
| 2006/0130270 | A1 | * | 6/2006 | Tondra ................. A47L 9/2805 15/361 |
| 2010/0170057 | A1 | * | 7/2010 | Lee ....................... A47L 9/2884 15/319 |
| 2011/0291433 | A1 | * | 12/2011 | Feng .................... B25J 17/0266 294/65 |
| 2013/0173057 | A1 | | 7/2013 | Balas et al. |
| 2017/0000305 | A1 | * | 1/2017 | Gordon .................. A47L 9/248 |
| 2019/0239709 | A1 | * | 8/2019 | Thomas ............... B25J 11/0085 |
| 2019/0343354 | A1 | | 11/2019 | Hong et al. |
| 2020/0353626 | A1 | * | 11/2020 | Wolff ........................ A47L 9/14 |

FOREIGN PATENT DOCUMENTS

| | | | |
|---|---|---|---|
| CN | 101611425 | A | 12/2009 |
| CN | 201654232 | U | 11/2010 |
| CN | 106802656 | A | 6/2017 |
| CN | 107205726 | A | 9/2017 |
| CN | 206479249 | U | 9/2017 |
| CN | 107625486 | A | 1/2018 |
| CN | 107752917 | A | 3/2018 |
| CN | 107788913 | A | 3/2018 |
| CN | 108378779 | A | 8/2018 |
| CN | 109613122 | A | 4/2019 |
| CN | 209148828 | U | 7/2019 |
| CN | 209372753 | U | 9/2019 |
| CN | 209611004 | U | 11/2019 |
| CN | 110623601 | A | 12/2019 |
| CN | 110710935 | A | 1/2020 |
| CN | 110731799 | A | 1/2020 |
| CN | 209966275 | U | 1/2020 |
| EP | 2759242 | A2 | 7/2014 |
| JP | 01219663 | A | 9/1989 |
| JP | 01232255 | A | 9/1989 |
| JP | 0377519 | A | 4/1991 |
| JP | 07313418 | A | 12/1995 |
| JP | 2000056006 | A | 2/2000 |
| JP | 2016131744 | A | 7/2016 |
| KR | 100820740 | B1 | 4/2008 |
| WO | 2018211823 | A1 | 11/2018 |

OTHER PUBLICATIONS

First Office Action for CN Patent Application No. 202010125236.3 mailed Jan. 14, 2022.
CN Rejection of Patent Application No. 20200125236.3 mailed Jun. 21, 2022.
International Search Report for PCT Patent Application PCT/2020/121975 mailed Jan. 19, 2021.
First Office Action for CN Patent Application No. 202010124592.3 mailed Jan. 14, 2022.
EP20921745.4—Extended European Search Report dated Jun. 21, 2024.
Non Final Office Action in U.S. Appl. No. 17/905,11 dated Aug. 29, 2024.
Partial European Search Report in Application No. 20921745.4 dated Feb. 19, 2024.
Extended European Search Report in Application No. 20921702.5 dated Feb. 12, 2024.

* cited by examiner 260 261  26      263 264 262

CLEANING ROBOT

CROSS-REFERENCE TO RELATED APPLICATIONS

The present application is a national stage application, filed under 35 U.S.C. § 371, of International Patent Application No. PCT/CN2020/121975, filed Oct. 19, 2020, which claims the benefit of Chinese Patent Application No. 202010124592.3 filed on Feb. 27, 2020, both of which are incorporated herein by reference in their entireties.

TECHNICAL FIELD

The present disclosure relates to the field of smart home appliances, and specifically, to a cleaning robot.

BACKGROUND

In recent years, with the rapid development of computer technologies and artificial intelligence science, intelligent robot technologies have gradually become a hot spot in the field of modern robotics research. Among them, sweeping robots, as the most practical intelligent robots, can automatically complete cleaning ground by virtue of certain artificial intelligence. The sweeping robot will be developed to have better sweeping effect, higher cleaning efficiency, and clean greater area, with more advanced artificial intelligence.

Nowadays, more and more homes are carpeted, and carpets are required to be recognized as different sweeping modes of the sweeping robot are performed for a carpet and a normal ground.

SUMMARY

An objective of the present invention is to provide a cleaning robot, capable of solving at least one technical problem mentioned above. Specific solutions are as follows:

According to specific embodiments of the present invention, in a first aspect, the present invention provides a cleaning robot including a robot body and a control unit disposed in the robot body, and further including: a fixing unit disposed at a front bottom of the robot body, the fixing unit including a sleeve; and an ultrasonic sensor fixed in the sleeve and electrically connected to the control unit, the ultrasonic sensor being configured to emit an ultrasonic wave downward and receive echoes reflected by different ground forms.

Optionally, the sleeve is a hollow cylindrical shape with a center axis perpendicular to ground.

Optionally, the sleeve is a cylinder formed at the front bottom of the robot body.

Optionally, an end surface of a bottom of the sleeve is an inclined plane.

Optionally, the sleeve is provided with a fixing part configured to fix the ultrasonic sensor.

Optionally, the fixing unit further includes a washer disposed at a position at which the fixing part is in contact with the ultrasonic sensor.

Optionally, the fixing unit further includes a cover plate placed on the top of the ultrasonic sensor and configured to fix the ultrasonic sensor.

Optionally, the cover plate is provided with a connecting opening configured to electrically connect the ultrasonic sensor to the control unit.

Optionally, an upper surface of the cover plate is provided with a reinforcing rib, the reinforcing rib being configured to support a sensor other than the ultrasonic sensor in the cleaning robot.

Optionally, when a ground form is normal ground, a number of echo peaks received by the ultrasonic sensor is 6 to 10; or when a ground form is a carpet surface, a number of echo peaks received by the ultrasonic sensor is 1 to 2.

Compared with the prior art, the above solution of the embodiments of the present disclosure realizes, by disposing an ultrasonic sensor emitting downward at the lower side of the front of the cleaning robot and fixing the ultrasonic sensor in a sleeve, multiple echoes on a normal surface, so as to obtain a greater deviation of the ultrasonic echo waveform of the normal surface from the ultrasonic echo waveform of the carpet surface, thereby improving accuracy and precision of carpet recognition of the cleaning robot.

BRIEF DESCRIPTION OF DRAWINGS

The accompanying drawings herein are incorporated into this specification and constitute a part of this specification, for illustrating embodiments consistent with the present disclosure, and are used together with this specification to explain the principle of the present disclosure. Apparently, the accompanying drawings in the following description illustrates merely some embodiments of the present disclosure, and one of ordinary skill in the art can further derive other drawings from these accompanying drawings without creative efforts. In the accompanying drawings.

DESCRIPTION OF EMBODIMENTS

Figure 1A:
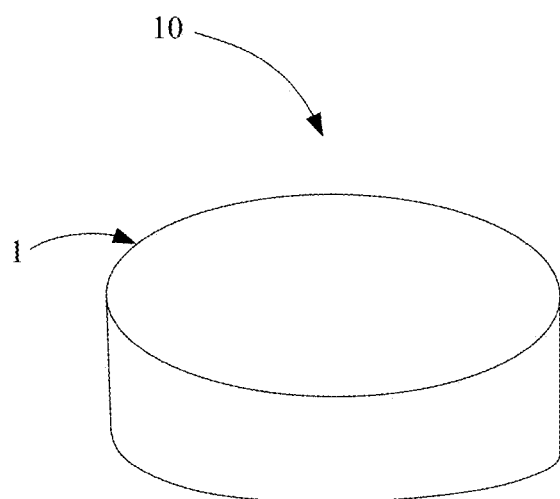
FIG. 1A illustrates a schematic view of a cleaning robot according to an embodiment of the present disclosure.

To make objectives, technical solutions, and advantages of the present disclosure clearer, the following describes the present disclosure in detail with reference to the accompanying drawings. Apparently, the described embodiments are merely some but not all of the embodiments of the present disclosure. All other embodiments obtained by one of ordinary skill in the art based on the embodiments of the present disclosure without creative efforts shall fall within the scope of protection of the present disclosure.

The terms used in the embodiments of the present disclosure are merely intended for the purpose of describing a particular embodiment but are not intended to limit the present disclosure. The singular forms "a", "an", "the" and "said" used in the embodiments and the claims of the present disclosure are also intended to include the plural forms, unless the context clearly indicates otherwise, "multiple" generally includes at least two.

It should be understood that, the term "and/or" used herein only describes an association relationship between associated objects and represents that three relationships may exist. For example, A and/or B may represent the following three cases: Only A exists, both A and B exist, and only B exists. In addition, the character "/" herein generally indicates an "or" relationship between associated objects.

It should be understood that, terms such as "first," "second" and "third" may be used in the embodiments of the present disclosure to describe an element, but the element should not be limited to these terms. These terms are merely used to distinguish the elements. For example, a first element may also be referred to as a second element, and similarly, a second element may also be referred to as a first element, without departing from the scope of the embodiments of the present disclosure.

Depending on the context, for example, the word "if" used herein may be explained as "while" or "when" or "in response to determining" or "in response to detecting". Similarly, depending on the context, the phrase "if determining" or "if detecting (a stated condition or event)" can be explained as "when determining" or "in response to determining" or "when detecting (the stated condition or event)" or "in response to detecting (the stated condition or event)".

It should further be noted that the term "comprise", "include", or any other variants thereof is intended to comprise in a non-exclusive mode, so that an article or apparatus including a series of elements includes those series of elements, and also includes other elements that are not explicitly listed, or elements that are inherent to such an article, or apparatus. An element defined by the phrase "including a . . . " does not exclude presence of the same element in the article, or apparatus that includes the element, without more restrictions.

Optional embodiments of the present disclosure will be explained in detail hereinafter with reference to the accompanying drawings.

Embodiment 1

Figure 1B:
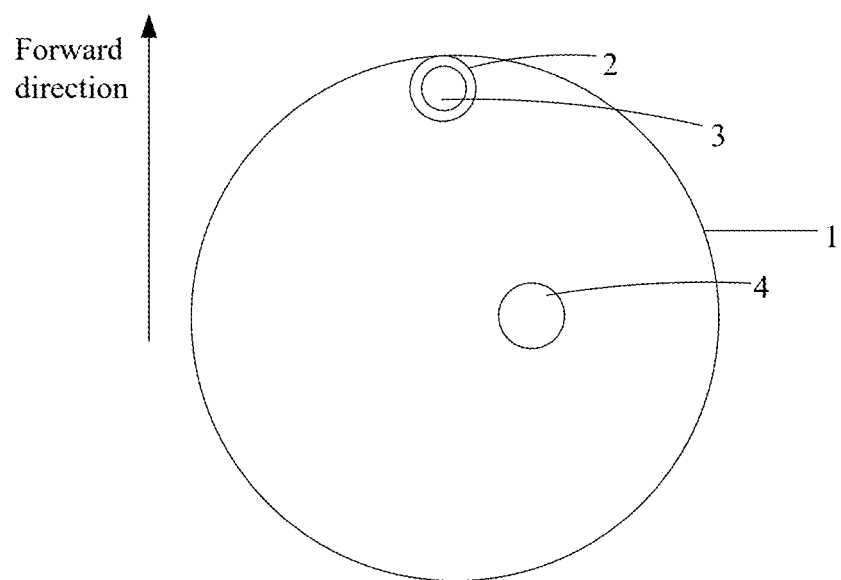
FIG. 1B illustrates a schematic bottom view of a cleaning robot according to an embodiment of the present disclosure.

FIG. 1A and FIG. 1B illustrate structural schematic diagrams of a cleaning robot 10 according to an exemplary embodiment. FIG. 1A exemplarily illustrates a schematic view of the cleaning robot 10, and FIG. 1B exemplarily illustrates a schematic bottom view of the cleaning robot 10.

As illustrated in FIG. 1A and FIG. 1B, the cleaning robot 10 includes: a machine body 1, a control unit 4, a fixing unit 2 and an ultrasonic sensor 3.

The machine body 1 forms a housing for the cleaning robot 10, and accommodates components, for example, a sensing unit, a driving unit, a cleaning unit, an energy unit and a human-machine interaction unit, which are not shown, and various unit components of any existing cleaning robots that may be integrated onto the machine body of the present disclosure, to complete overall operation function of the cleaning robot 10 described in the embodiment of the present disclosure. The integration or positional relationship of the above mentioned units is not a key point in the disclosure and will not be elaborated herein. Optionally, the machine body has a flat cylinder. Further, the cylinder is provided with a chamfer at an edge of a bottom to achieve an obstacle crossing function.

The control unit is disposed in the machine body 1, for example on a circuit board in the machine body 1. The control unit includes a processor. The processor may comprehensively determine a form of the current ground based on an echo signal fed back by the sensing unit. Optionally, the processor is a microcontroller unit (MCU) or an arithmetic processor (AP).

The form of the ground includes a normal ground and a carpet surface. The normal ground includes a smooth ground such as a wooden floor, a floor tile, and a ceramic tile. The carpet surface indicates a ground surface which is carpeted by a carpet. Here, the carpet may be understood in a broad sense as including clothes and articles containing plush.

Figure 2:
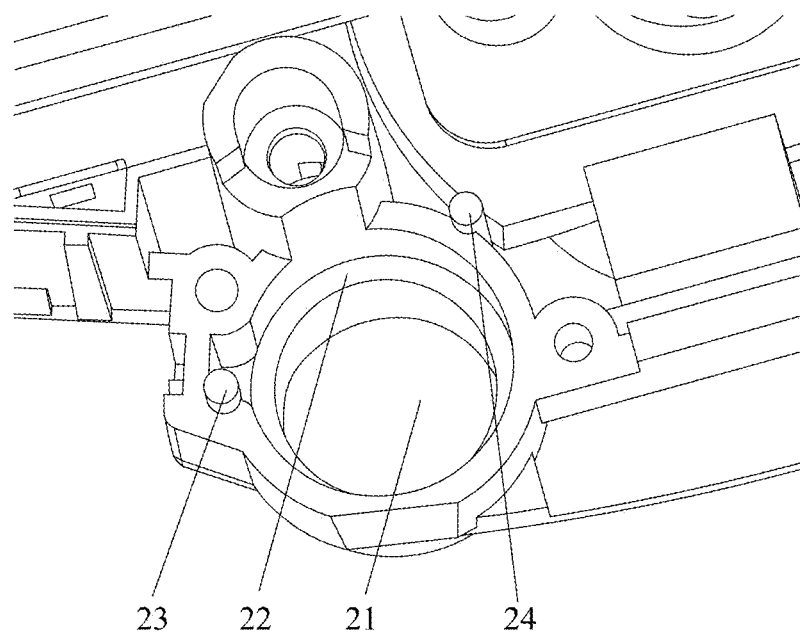
FIG. 2 illustrates a three-dimensional view of a sleeve and a washer after being assembled in a fixing unit according to an embodiment of the present disclosure.

The fixing unit 2 is disposed in front of a base of the machine body 1 and configured to fix the ultrasonic sensor 3 so as to determine the form of the ground in time conveniently. For example, the fixing unit 2 includes a sleeve 21. A center axis of the sleeve is perpendicular to the ground which enables an echo signal received by the ultrasonic sensor 3 to be diffused uniformly within the sleeve, thereby enabling the echo signal to return at a fixed time. Optionally, as illustrated in FIG. 2, the sleeve is a cylinder directly provided in the front portion of the base of the machine body 1. If the bottom of the ultrasonic sensor 3 is exposed through a cylinder, a hollow cylinder of the same size may be added at the bottom of the cylinder. Such a sleeve structure can save manufacturing costs and mounting time. In other embodiments, the sleeve 21 and the machine body 1 may be two independent structures, and they are assembled together.

For example, a surface of the sleeve 21 facing the ground is a plane, i.e., parallel to the ground, so that more effective echoes can be received in a sweeping process. However, in some embodiments, an edge of the base of the cleaning robot 10 is provided with a chamfer. To fit the overall shape of the cleaning robot 10, an end of the sleeve 21 facing the ground is required to have a same shape as the chamfer; otherwise a bottom surface of the sleeve 21, which is set as a plane, is prone to be easily damaged during the movement of the cleaning robot 10. Optionally, the end surface of the bottom of the sleeve 21 is set as an inclined plane.

Figure 3:
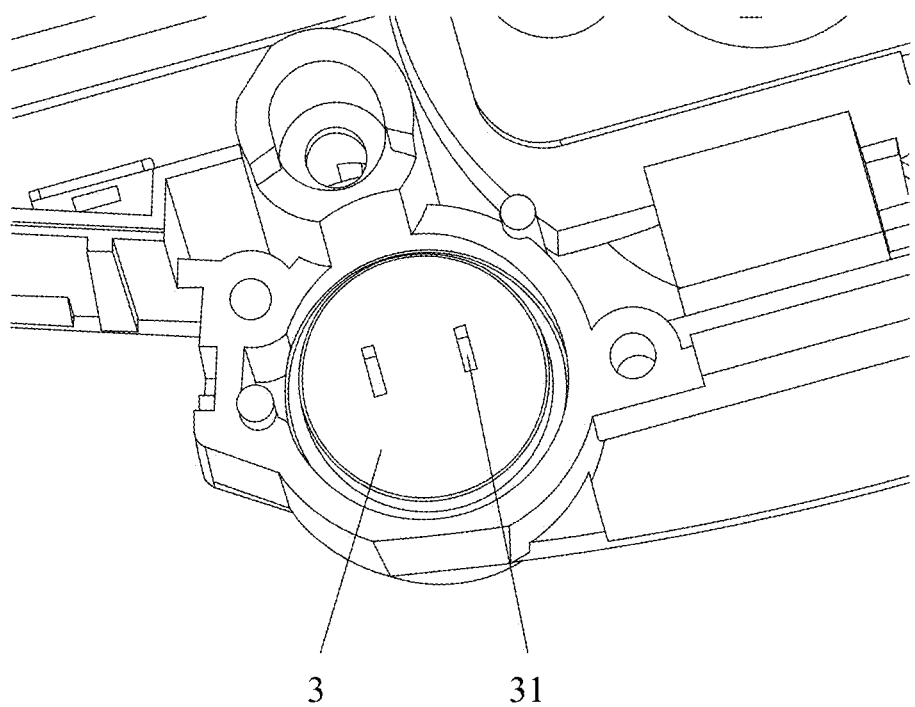
FIG. 3 illustrates a three-dimensional view of the cleaning robot provided with a cylinder at the front bottom according to FIG. 1A and FIG. 1B.

As illustrated in FIG. 3, the ultrasonic sensor 3 is fixed in the sleeve 21, and is electrically connected to the control unit. The ultrasonic sensor 3 is configured to transmit an ultrasonic signal to the ground vertically and to receive an echo signal reflected by the ground. The ultrasonic sensor 3 is further configured to convert the received echo signal into an electric signal and transmit it to the control unit. The type of the ultrasonic sensor can be selected based on actual requirements and is not limited herein.

Optionally, the ultrasonic sensor 3 is provided with two metal plugs 31 on a top thereof. The metal plugs 31 are configured to be electrically connected to the control unit for signal transmission, and for example, may be electrically connected to the control unit in a wired way. In other embodiments, the ultrasonic sensor 3 may be provided with a golden finger (not shown) on the top thereof. The golden finger includes a plurality of golden conductive contacts. A signal of the ultrasonic sensor 3 may be transmitted to the control unit through the golden finger.

Figure 4A:
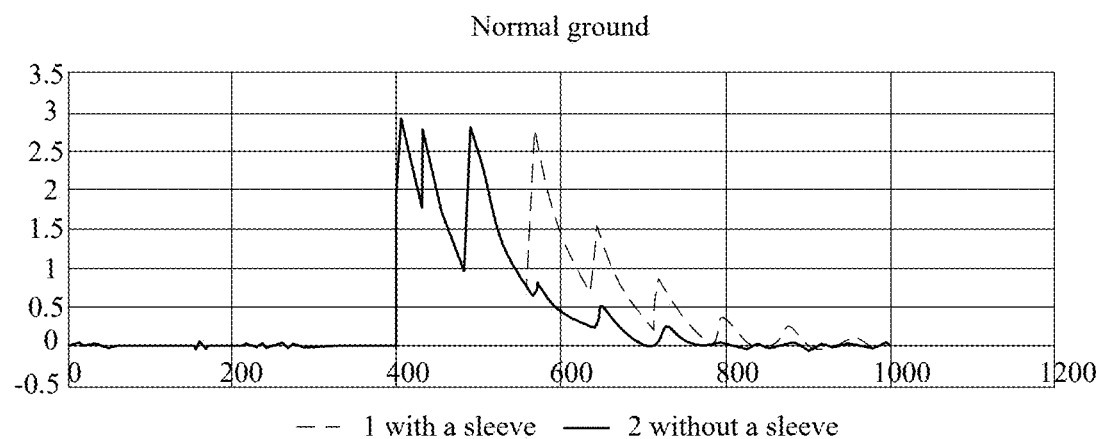
FIG. 4A illustrates echo waveforms reflected by normal ground that are received by two types of ultrasonic sensors with and without a sleeve according to an embodiment of the present disclosure.
Figure 4B:
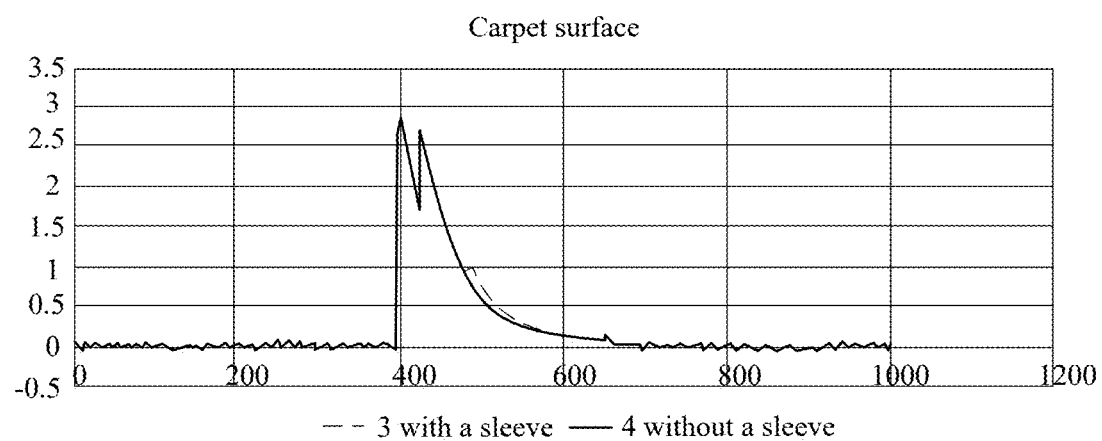
FIG. 4B illustrates echo waveforms reflected by a carpet surface that are received by two types of ultrasonic sensors with and without a sleeve according to an embodiment of the present disclosure.

In an exemplary embodiment of the present disclosure, fixing the ultrasonic sensor 3 in the sleeve 21 can improve accuracy of carpet recognition of the cleaning robot. An operation principle of improving the accuracy of carpet recognition is illustrated by FIG. 4A and FIG. 4B below. FIG. 4A exemplarily illustrates echo waveforms reflected by normal ground and received by two ultrasonic sensors with and without a sleeve; and FIG. 4B exemplarily illustrates echo waveforms reflected by a carpet surface and received by two ultrasonic sensors with and without a sleeve. As illustrated in FIG. 4A, the sleeve 21 is not provided at the periphery of the ultrasonic sensor 3, i.e., the ultrasonic sensor 3 is exposed, the control unit controls the ultrasonic sensor 3 to transmit an ultrasonic signal to the normal ground and receive an echo. Similarly, after the sleeve 21 is provided at the periphery of the ultrasonic sensor 3, the control unit controls the ultrasonic sensor 3 to transmit an ultrasonic signal to the normal ground and receive an echo signal. An amount of the received echo peaks is 6 to 10. Compared with the ultrasonic sensor 3 without the sleeve 21, the ultrasonic sensor 3 with the sleeve 21 achieves the acquisition of multiple echoes of the normal ground. As illustrated in FIG. 4B, as for the ultrasonic sensors 3 with and without the sleeve, when the transmitted ultrasonic wave is reflected on the carpet surfaces, echoes of both types are short, with only 1 to 2 peaks, as an ultrasonic wave is almost completely absorbed by the carpet.

Accordingly, it can be seen from the above comparison between FIG. 4A and FIG. 4B that, with the sleeve, the deviation of the ultrasonic waveform reflected by the normal ground and the ultrasonic waveform reflected by the carpet surface is greater, so that the accuracy and the precision of carpet recognition can be substantially improved.

Further, the fixing unit 2 includes a fixing part 22 configured to fix the ultrasonic sensor 3 in the sleeve 21. Optionally, the fixing part 22 is a step positioned on an inner wall of the sleeve 21. The step and the sleeve 21 are integrated into an integral structure through injection-molded. The step can support the ultrasonic sensor 3, thereby fixing the ultrasonic sensor 3. The shape of the step matches the outline of the ultrasonic sensor 3 and is not specifically defined. Certainly, the fixing part 22 is not limited to be disposed inside the sleeve 21, and may instead be disposed outside of the sleeve 21, as long as the ultrasonic 3 does not fall off.

Optionally, the fixing unit 2 further includes a fixed anchor point 23 and a movable anchor point 24 which are disposed apart on the outer side of the top of the sleeve 21 for fixing the ultrasonic sensor 3.

Figure 5:
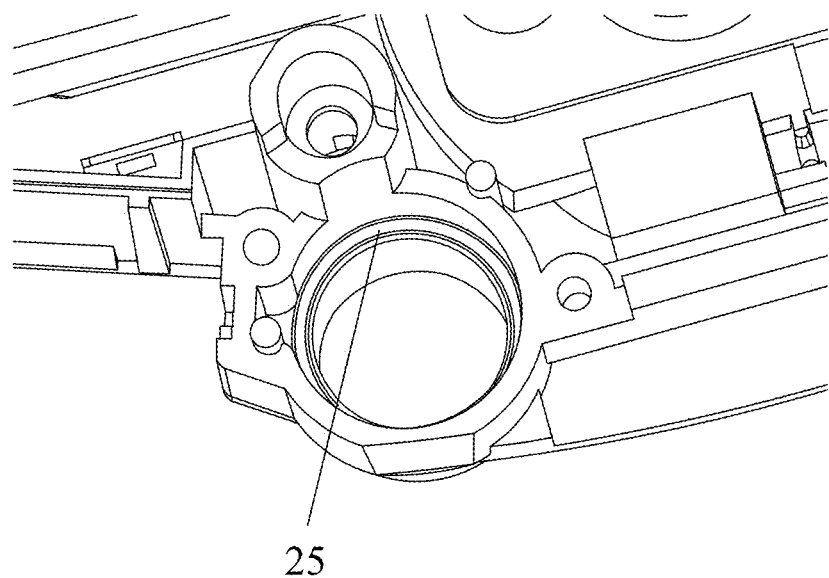
FIG. 5 illustrates a three-dimensional view of an ultrasonic sensor after being assembled to a fixing unit according to an embodiment of the present disclosure.

Optionally, as illustrated in FIG. 5, the fixing unit 2 further includes a washer 25 disposed at a position where the fixing part 22 is in contact with the ultrasonic sensor 3. For example, while mounting the ultrasonic sensor 3, the washer 25 is first placed on the step, and then the ultrasonic sensor 3 is placed. In this way, when the cleaning robot 10 is performing a sweeping task, the washer 25 can serve a role of damping, and further prolong the service life of the ultrasonic sensor 3.

Figure 6:
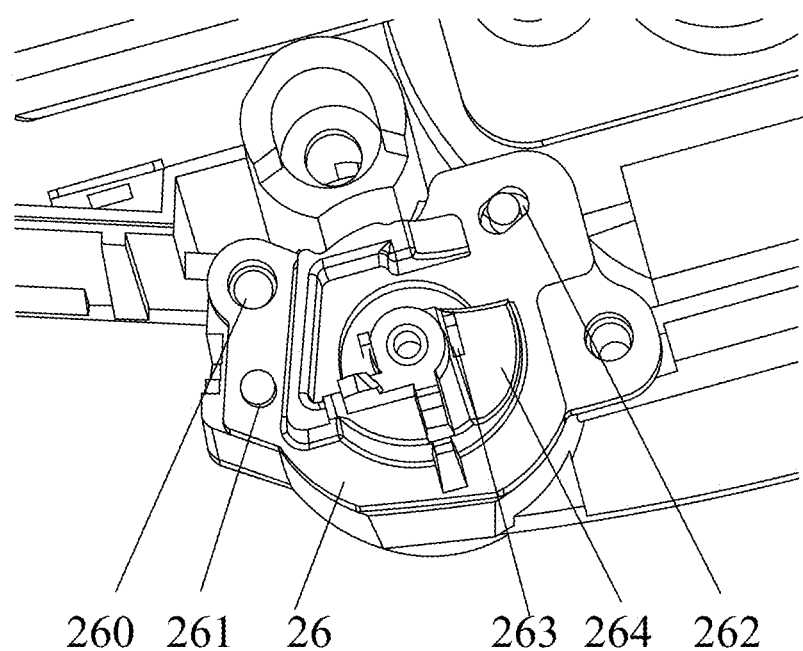
FIG. 6 illustrates a three-dimensional view of a cover plate after fixing an ultrasonic sensor according to an embodiment of the present disclosure.

Optionally, as illustrated in FIG. 6, the fixing unit 2 includes a cover plate 26 placed on the top of the ultrasonic sensor 3 for fixing the ultrasonic sensor 3 from above. For example, the cover plate 26 is provided with a screw hole 260, so as to fix the ultrasonic sensor 3 through a screw. Optionally, the cover plate 26 is further provided with a first slot/hole 261 corresponding to the fixed anchor point 23 and a second slot/hole 262 corresponding to the movable anchor point 24. The first slot/hole 261 exactly matches the fixed anchor point 23, and is fixed after mounting. The second slot/hole 262 is configured to accommodate the movable anchor point 24 and to enable the movable anchor point 24 to be fine adjusted in the second slot/hole 262, so as to facilitate screw mounting. The cover plate 26 is fixedly connected to the machine body 1 after mounting. The shape of the cover plate 26 is not limited and can be selected based on the internal structure of the ultrasonic sensor or the machine body.

Optionally, the cover plate 26 is further provided with a connection opening 263 configured to enable the metal plug or the Golden Finger, electrically connecting the ultrasonic sensor 3 to the control unit, to pass through. When the cover plate 26 is fixed to the top of the ultrasonic sensor 3, the metal plug or Golden Finger on the top of the ultrasonic sensor 3 can pass through the connection opening 263 and is electrically connected to the control unit.

Optionally, the cover plate 26 is provided with a reinforcing rib 264 on an upper surface thereof. The reinforcing rib 264 can strengthen a structure of the cover plate 26, and furthermore, can be configured to support other sensors of the cleaning robot 10. For example, setting a part of the reinforcing rib 264 as a side curved structure can conveniently assist an obstacle sensor (not shown) fixedly disposed directly in front of the machine body 1. Certainly, the structure of the reinforcing rib can be machined based on the profiles of other sensors, which is not limited here.

It should be noted that, the cleaning robot 10 may not only be a sweeping robot or mopping robot, but also may be other intelligent robots that have an autonomous traveling mechanism and is required to recognize the form of the ground.

In summary, by disposing the ultrasonic sensor, which transmits downward, at a portion in the front of the bottom of the cleaning robot, and fixing the ultrasonic sensor in the sleeve, the cleaning robot 10 provided in the embodiment of the present disclosure achieves multiple echoes on the normal surface, so as to make the deviation of the ultrasonic echo waveform of the normal surface from the ultrasonic echo waveform of the carpet surface greater, thereby improving the accuracy and the precision of carpet recognition of the cleaning robot.

Embodiment 2

Figure 7:
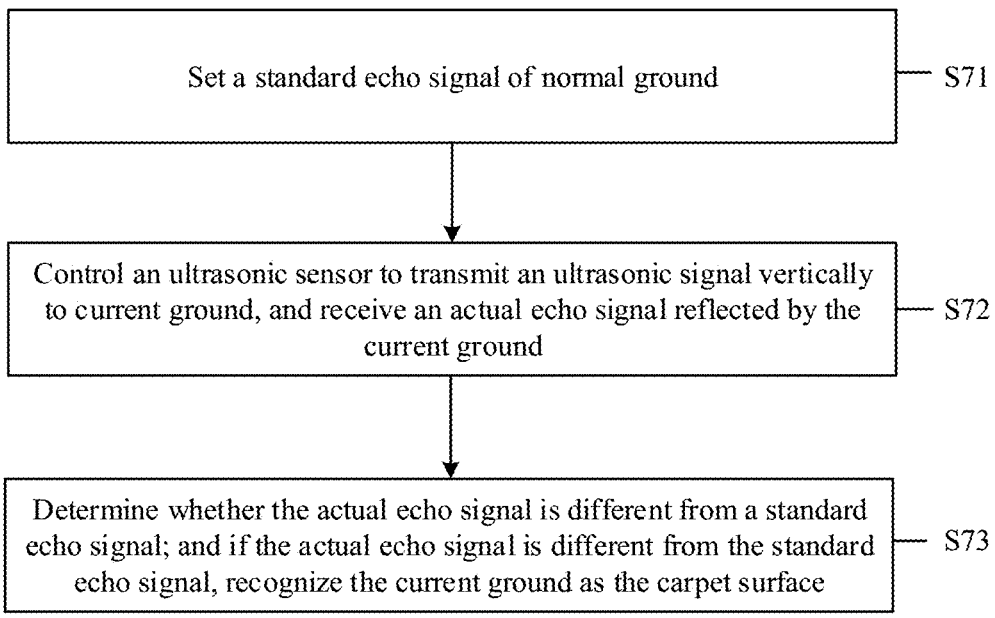
FIG. 7 illustrates a flowchart of a carpet recognition method applicable to a cleaning robot according to an embodiment of the present disclosure.

FIG. 7 illustrates a carpet recognition method applicable to a cleaning robot according to an exemplary embodiment. The carpet recognition method applicable to the cleaning robot according to this embodiment is applied to the cleaning robot illustrated in FIG. 1A and FIG. 1B. As illustrated in FIG. 7, the carpet recognition method applicable to the cleaning robot includes the following steps:

S71: A standard echo signal of a normal ground is set, wherein the standard echo signal includes a standard echo waveform, an amount of peaks in standard echo signal and other signals that can characterize an acoustic wave.

Optionally, before performing cleaning, the cleaning robot first obtains a standard echo waveform of the normal ground based on a factory standard setting of the cleaning robot. The factory standard includes an echo characteristic of the normal ground which is generated based on user big data, and may further include an echo characteristic of a carpeted ground, such as an amount of peaks in echo signal, to set the standard echo signal of the normal ground more accurately.

Figure 8:
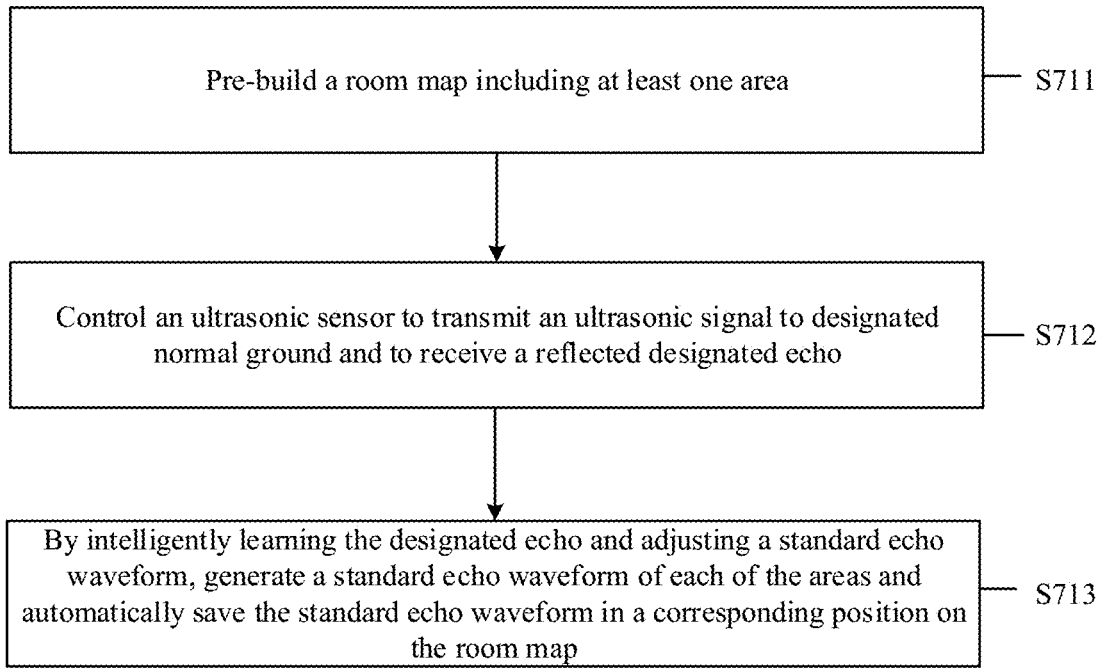
FIG. 8 illustrates a flowchart of a method applicable to a cleaning robot, in which a standard echo waveform is adjusted through intelligent learning in an actual sweeping condition of the cleaning robot on a designated normal ground according to an embodiment of the present application.

Optionally, on the basis of obtaining the standard echo waveform of the normal ground based on the factory standard setting, setting the standard echo signal of the normal ground further includes: adjusting the standard echo waveform through intelligent learning based on an actual sweeping condition of the cleaning robot on a designated normal ground. For example, as illustrated in FIG. 8, adjusting the standard echo waveform through intelligently learning based on an actual sweeping condition of the cleaning robot on the designated normal ground includes:

S711: A room map including at least one area is created in advance, wherein the room map includes at least one area. If the room map includes a plurality of areas, the standard echo waveform is an echo waveform corresponding to each area of the plurality of areas. Certainly, a room map may not be created, and the entire room is considered as an area.

S712: The ultrasonic sensor is controlled to transmit an ultrasonic signal to a designated normal ground and to receive a designated echo that is reflected. For example, a user places the cleaning robot on the normal ground in the room, and the cleaning robot actually performs one or more sweepings and receives one or more designated echoes. The designated normal ground indicates a to-be swept normal ground selected subjectively by the user, and the designated echo is an echo reflected by the designated normal ground.

S713: The standard echo waveform of each of the plurality of areas is generated through intelligently learning the designated echo and adjusting the standard echo waveform, and is saved at a corresponding position on the room map automatically. It should be understood that, the set standard echo waveform of the normal ground can be adjusted based on an actual condition of the ground on which the cleaning robot is operated by the user. As more sweepings are performed, the standard echo waveform will be learned automatically and saved at the corresponding position on the room map.

Optionally, the standard echo signal of the normal ground is a user-defined signal. For example, setting the standard echo signal of the normal ground includes: providing a user with a learning mode, and guiding the user to collect echo data of the normal ground and echo data of the carpet surface by using the cleaning robot; and obtaining the standard echo signal of the normal ground based on the echo data of the normal ground and the echo data of the carpet surface. The user is guided to collect the echo data of the carpet surface to further determine a critical value of the standard echo signal of the normal ground accurately, for example, a minimum amount of peaks and a roughness of the standard echo waveform.

Figure 9:
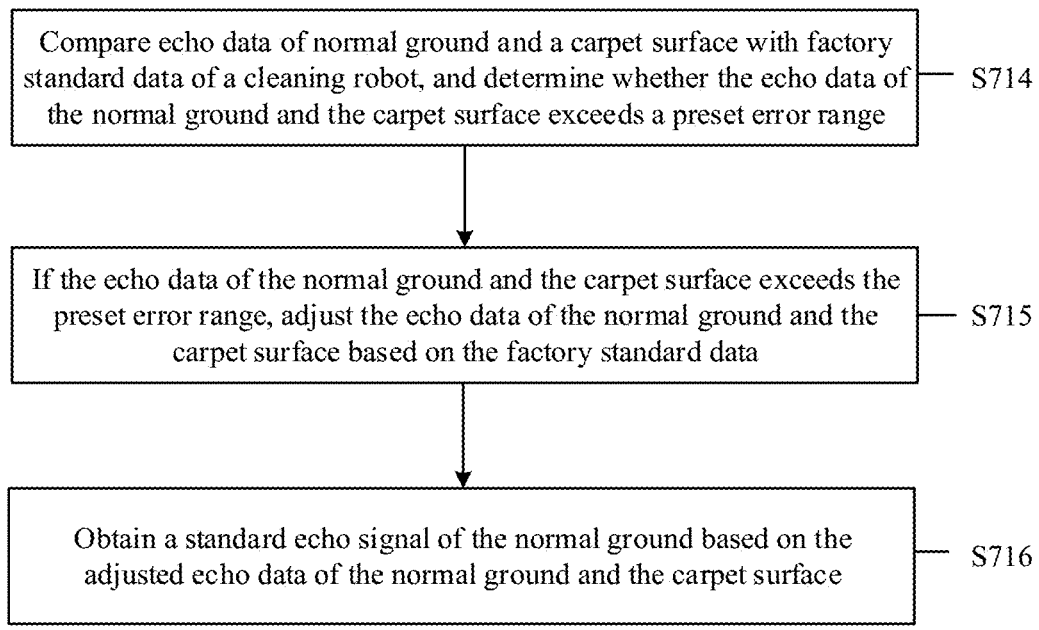
FIG. 9 illustrates a flowchart of a method applicable to a cleaning robot, in which a standard echo signal of a normal ground is obtained according to an echo data of the normal ground and an echo data of a carpet surface.

To avoid that a carpet mode of the cleaning robot cannot be turned on due to a large error in the learning process of the user, the factory standard data may be further taken into account to obtain the standard echo signal of the normal ground, so as to perform carpet recognition more accurately. Referring to FIG. 9, obtaining the standard echo signal of the normal ground based on the echo data of the normal ground and the echo data of the carpet surface includes:

S714: The echo data of the normal ground and the echo data of the carpet surface are compared with factory standard data of the cleaning robot, and it is determined whether the echo data of the normal ground and the echo data of the carpet surface exceed a preset error range. The preset error range is set based on an actual condition, which is not limited herein.

S715: If the echo data of the normal ground and the echo data of the carpet surface exceed the preset error range, the echo data of the normal ground and the echo data of the carpet surface are adjusted based on the factory standard data. For example, if the preset error range is set to be 1 to 2, and an amount of echo peaks in the echo data of the normal ground in the factory standard data is 5 to 9, when an amount of echo peaks in the echo data of the normal ground that are collected by the user are 11, it is determined that the echo data of the normal ground collected by the user is incorrect.

S716: A standard echo signal of the normal ground is obtained according to the adjusted echo data of the normal ground and the adjusted echo data of the carpet surface.

S72: The ultrasonic sensor is controlled to transmit an ultrasonic signal to a current ground vertically, and receive an actual echo signal reflected by the current ground.

For example, after setting the standard echo signal of the normal ground, the control unit transmits an electric signal to the ultrasonic sensor, the ultrasonic sensor converts the electric signal into an ultrasonic signal and transmits the ultrasonic signal downward to a ground, and the ultrasonic signal is reflected by the ground, the reflected ultrasonic signal is received and converted into an electric signal by the ultrasonic sensor and the electric signal is transmitted to the control unit.

S73: It is determined whether the actual echo signal is different from the standard echo signal; and, the current ground is recognized as a carpet surface if the actual echo signal is different from the standard echo signal.

In this step, determining whether the actual echo signal is different from the standard echo signal to recognize whether the current ground is the carpet surface includes:
  determining whether an amount of peaks in the actual echo signal is less than an amount of peaks in the standard echo signal; and if the amount of peaks in the actual echo signal is less than the amount of peaks in the standard echo signal, recognizing the current ground as the carpet surface. For different areas, the actual echo signal can be individually compared with the standard echo signal corresponding to the current area, to improve the accuracy of carpet recognition.

Optionally, before determining and recognition processes are performed, the actual echo signal may be adjusted. For example, the currently received actual echo signal is adjusted through intelligent learning based on a plurality of received actual echo signals reflected by the current ground. It can be understood as that, the cleaning robot performs recognition for multiple times based on the ground of the user, and automatically learns the actual echo signals received during each recognition, to improve the accuracy of carpet recognition.

Optionally, if the ultrasonic signal reflected by the current ground is scattered at an end surface of the bottom of the sleeve, waveform compensation is performed on the received actual echo signal. It can be understood as that, when the end surface of the bottom of the sleeve is an inclined plane, the echo reflected by the ground will be scattered to a certain extent at the inclined plane. Therefore, the waveform compensation may be performed on the received actual echo signal before determining and recognition are performed. A waveform compensation method includes: setting an amplitude threshold; and performing weight compensation on a peak less than the amplitude threshold, so that the actual echo signal is consistent with the actual echo signal received when the end surface of the bottom is a plane. Certainly, it is not limited to that method, as long as the actual echo signal is consistent with the actual echo signal received when the end surface of the bottom is a plane.

Optionally, the cleaning robot will make operation noises during operation, for example, a fan, main brush rotation, side brush rotation, and wheel advancing. These operation noises affect determining the actual echo signal, and thus the actual echo signal is required to be de-noised. Optionally, the control unit performs median filtering on the received actual echo signal. In other embodiments, the ultrasonic signal emitted by the ultrasonic sensor is encoded, and the operation noises in the actual echo signal can be removed based on the encoding. Herein, for details of the de-noising process, the de-noising method in the prior art can be referred to, and details will not be elaborated herein.

Further, when the current ground is recognized as the carpet surface, the control unit controls the cleaning robot to enter a carpet mode, for example, increasing suction of the fan to clean the carpet better; or if the cleaning robot has a mopping function, the cleaning robot is controlled to lift a mopping tool or stop the mopping tool, to prevent the carpet from getting wet.

Finally, according to the carpet recognition method applicable to the cleaning robot according to the embodiment of the present disclosure, a ultrasonic sensor facing downward is disposed at a front portion of the bottom of the cleaning robot, a ground condition is detected through the ultrasonic wave, and a movement mode of the sweeping robot is changed if the detection result indicates a carpet. In this way, the problem of low accuracy and poor recognition effect of an infrared sensor for carpet recognition is solved, and the accuracy and the precision of carpet recognition of the cleaning robot can be improved.

Finally, it should be noted that the foregoing embodiments are merely intended to describe the technical solutions of this disclosure, rather than limit this disclosure. Although this disclosure is described in detail with reference to the foregoing embodiments, one of ordinary skill in the art should understand that modifications can still be made to the technical solutions described in the foregoing embodiments or equivalent replacements can be made to some technical features thereof, without departing from the spirit and the scope of the technical solutions of the embodiments in this disclosure.

What is claimed is:

1. A cleaning robot, comprising a robot body and a control unit disposed in the robot body, wherein the cleaning robot further comprises:
    a fixing unit disposed at a front bottom of the robot body, the fixing unit comprising a sleeve; and
    an ultrasonic sensor fixed in the sleeve to achieve multiple echoes of a normal ground and electrically connected to the control unit, the ultrasonic sensor being configured to emit an ultrasonic wave downward and receive echoes reflected by different ground forms, and a deviation of a ultrasonic echo waveform reflected by the normal ground and the ultrasonic echo waveform reflected by a carpet surface with the sleeve is greater than that without providing the sleeve.

2. The cleaning robot according to claim 1, wherein the sleeve is a hollow cylindrical shape with a center axis perpendicular to ground, wherein the ground is planar.

3. The cleaning robot according to claim 1, wherein the sleeve is a cylinder formed at the front bottom of the robot body.

4. The cleaning robot according to claim 1, wherein an end surface of a bottom of the sleeve is inclined with respect to a planar plane.

5. The cleaning robot according to claim 1, wherein the sleeve is provided with a fixing part configured to fix the ultrasonic sensor.

6. The cleaning robot according to claim 5, wherein the fixing unit further comprises a washer disposed at a position at which the fixing part is in contact with the ultrasonic sensor.

7. The cleaning robot according to claim 1, wherein the fixing unit further comprises a cover plate placed on a top of the ultrasonic sensor and configured to fix the ultrasonic sensor.

8. The cleaning robot according to claim 7, wherein the cover plate is provided with a connecting opening configured to electrically connect the ultrasonic sensor to the control unit.

9. The cleaning robot according to claim 7, wherein an upper surface of the cover plate is provided with a reinforcing rib, the reinforcing rib being configured to support a sensor other than the ultrasonic sensor in the cleaning robot.

10. The cleaning robot according to claim 1, wherein when a ground form is normal ground, a number of echo peaks received by the ultrasonic sensor is 6 to 10.

11. The cleaning robot according to claim 1, wherein when a ground form is the carpet surface, a number of echo peaks received by the ultrasonic sensor is 1 to 2.

* * * * *